United States Patent Office 3,386,605
Patented June 4, 1968

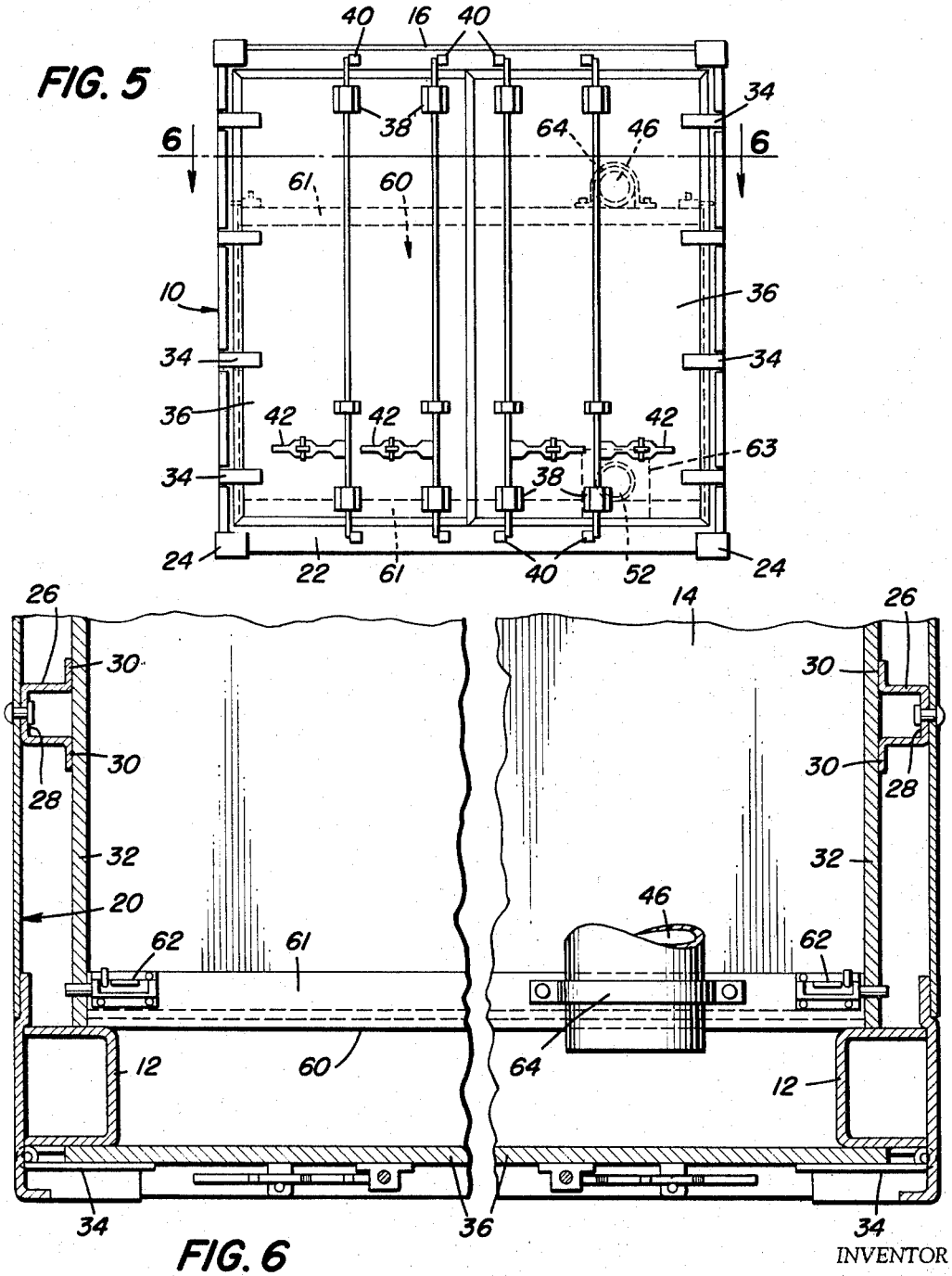

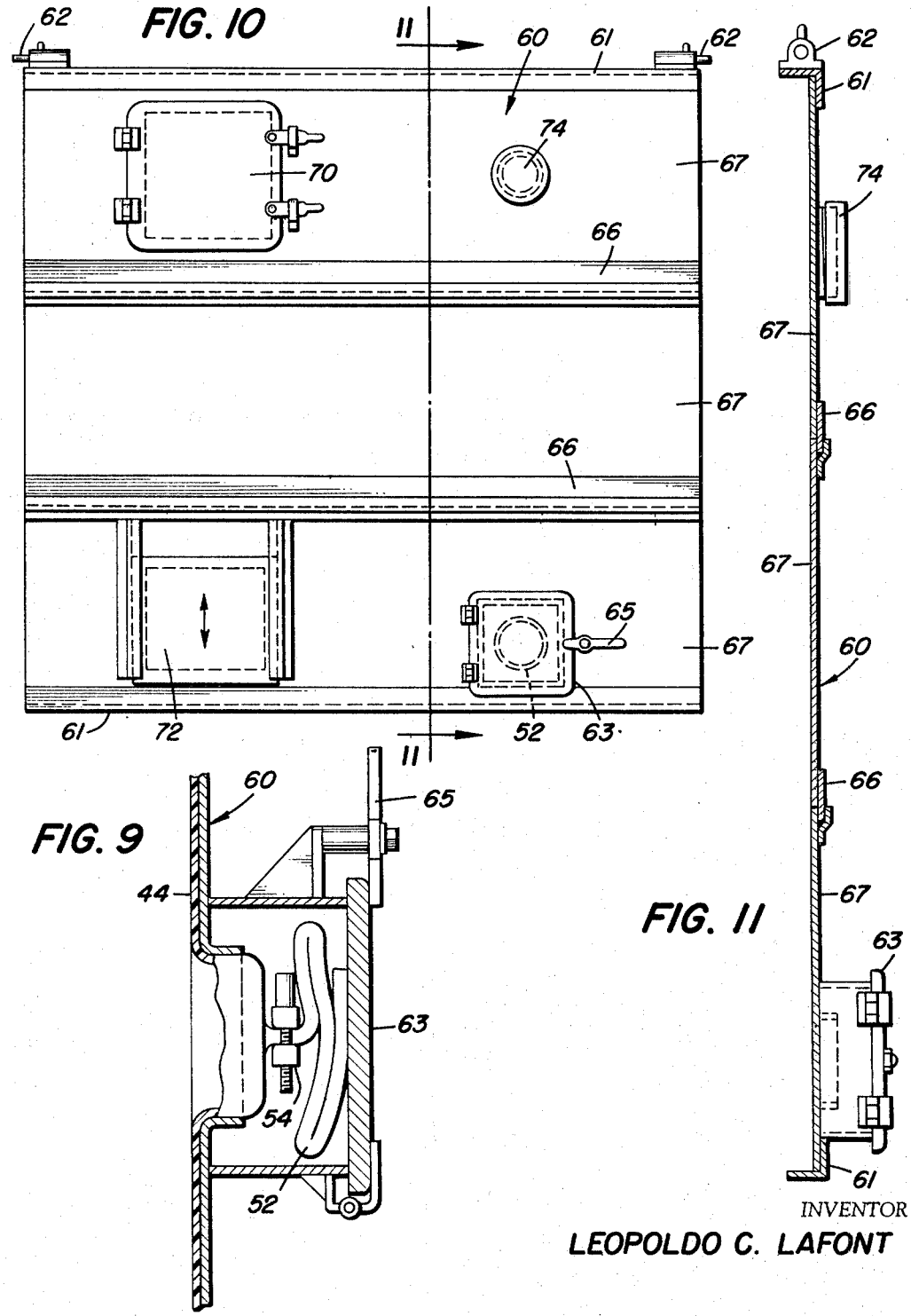

3,386,605
THREE PURPOSE CONTAINER
Leopoldo C. Lafont, Newark, N.J., assignor to John J. McMullen Associates, Inc., New York, N.Y., a corporation of New York
Filed Oct. 21, 1966, Ser. No. 588,391
15 Claims. (Cl. 220—1.5)

The present invention relates to demountable containers of the type used to carry cargo which can be stacked in container ship hulls or individually carried on truck beds or the like. More particularly, the invention provides the possibility of carrying bulk cargo, dry or liquid, in a standard modular size demountable cargo container, for example, that as defined in Groups 1 or 2 of specification MHS of the American Standard Association.

Conventional containers of the type described apparently serve to house packaged cargo but cannot serve to carry liquid or contaminating bulk cargo such as chemicals or the like due to the fact that these containers are not adequately sealed for liquid transportation and the interior of these containers are not adequately sealed for liquid transportation and the interior of these containers are subject to contamination when carrying bulk cargo. Certain non-contaminating bulk cargo, such as grain, may be carried in the conventional container but a problem is experienced during loading of spillage through the opened container rear doors.

It is the primary purpose of the present invention to give the standard container the capability of carrying bulk cargo, dry or liquid, without experiencing the above problems. According to the invention, this purpose is achieved by installing liners of suitable material and incorporating a portable bulkhead covering the container door opening and other possible nonstandard openings which might be encountered in the particular container being converted.

Briefly stated, one embodiment of the present invention capable of carrying liquid bulk cargo consists of a rectangular prismatic bag of thin, non-load bearing plastic material which when loaded conforms to the interior of the container. In order to support the bag and transmit static and dynamic load forces to the container, a portable bulkhead is installed at the door end of the container just behind the corner posts thereof. This bulkhead is essential and serves to distribute cargo pressures to the container framework. Without the bulkhead the container doors will not close. For the most expedient handling, loading and discharging, a single bag running the length of the container is installed therein with appropriate filling lines, vents, and means to reduce cargo surging during transport.

In order to carry contaminating dry bulk cargo in one of these containers, the present invention provides installation of thin sheets of plastic within the container so that the cargo is at all times out of contact with the interior container walls and floor. In this way, contamination is avoided and due to their reinstallation time, the container liners can be replaced when a different type of cargo is to be carried within the container. The liners are removably hung about the walls of the container. The portable bulkhead, as described, acts to prevent spillage when the container doors are open. For non-contaminating dry bulk cargo, the bulkhead is installed but the plastic sheets are not essential.

It is therefore an object of the present invention to provide new and improved means (which may be sold in kit form) for converting a standard container of the type described to one which can also carry bulk cargo, dry or wet, without experiencing leaking, contamination or spillage problems as described.

Other and further objects of the present invention will become apparent with the following detailed description when taken in view of the appended drawings where like characters refer to like structure and in which:

FIGURE 5 is a rear elevation of the container with doors closed;

FIGURE 6 is a horizontal sectional view taken along line 6—6 of FIGURE 5;

FIGURE 7 is a transverse vertical section through a bag showing a modified swash bulkhead;

FIGURE 8 is a top plan of a bag within a container showing a horizontal restraining net to confine the top center of the bag;

FIGURE 9 is a sectional view taken along line 9—9 of FIGURE 3;

FIGURE 10 is a front elevation of another embodiment of the portable bulkhead;

FIGURE 11 is a vertical section along line 11—11 of FIGURE 10;

Figure 1:
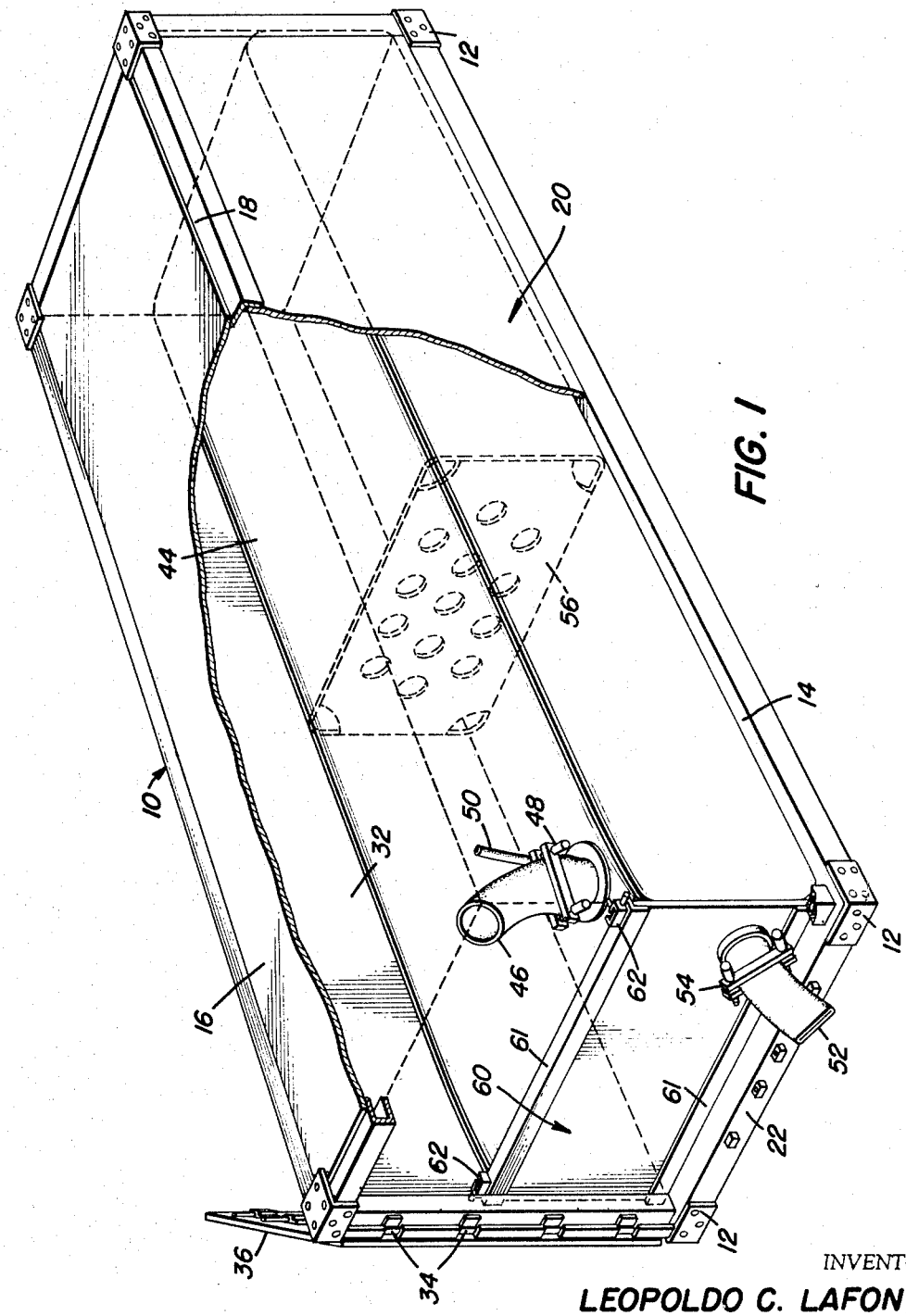
FIGURE 1 is a perspective view illustrating a typical container incorporating the present invention with parts broken away.
Figure 2:
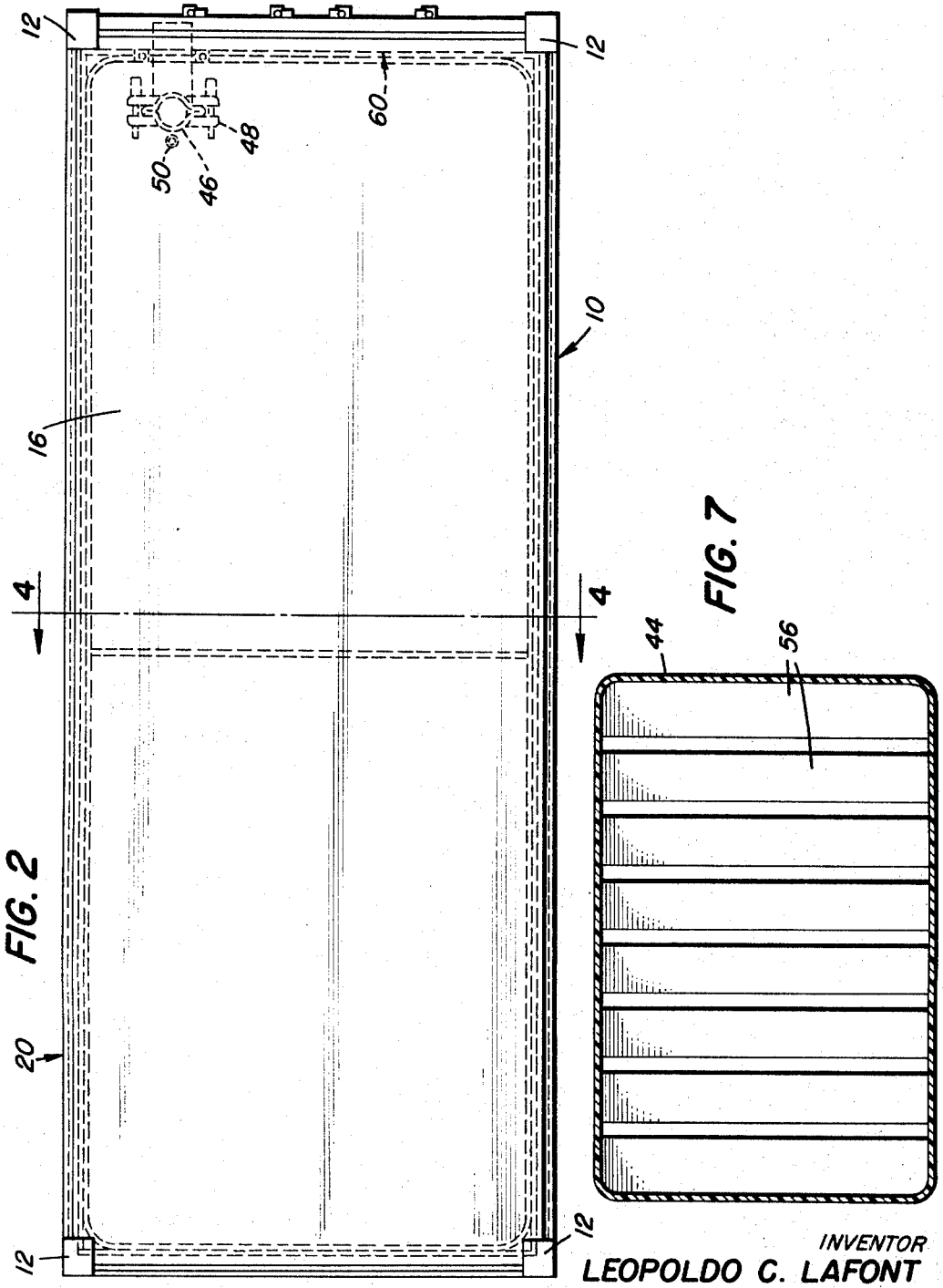
FIGURE 2 is a top plan of the container illustrated in FIGURE 1.
Figure 3:
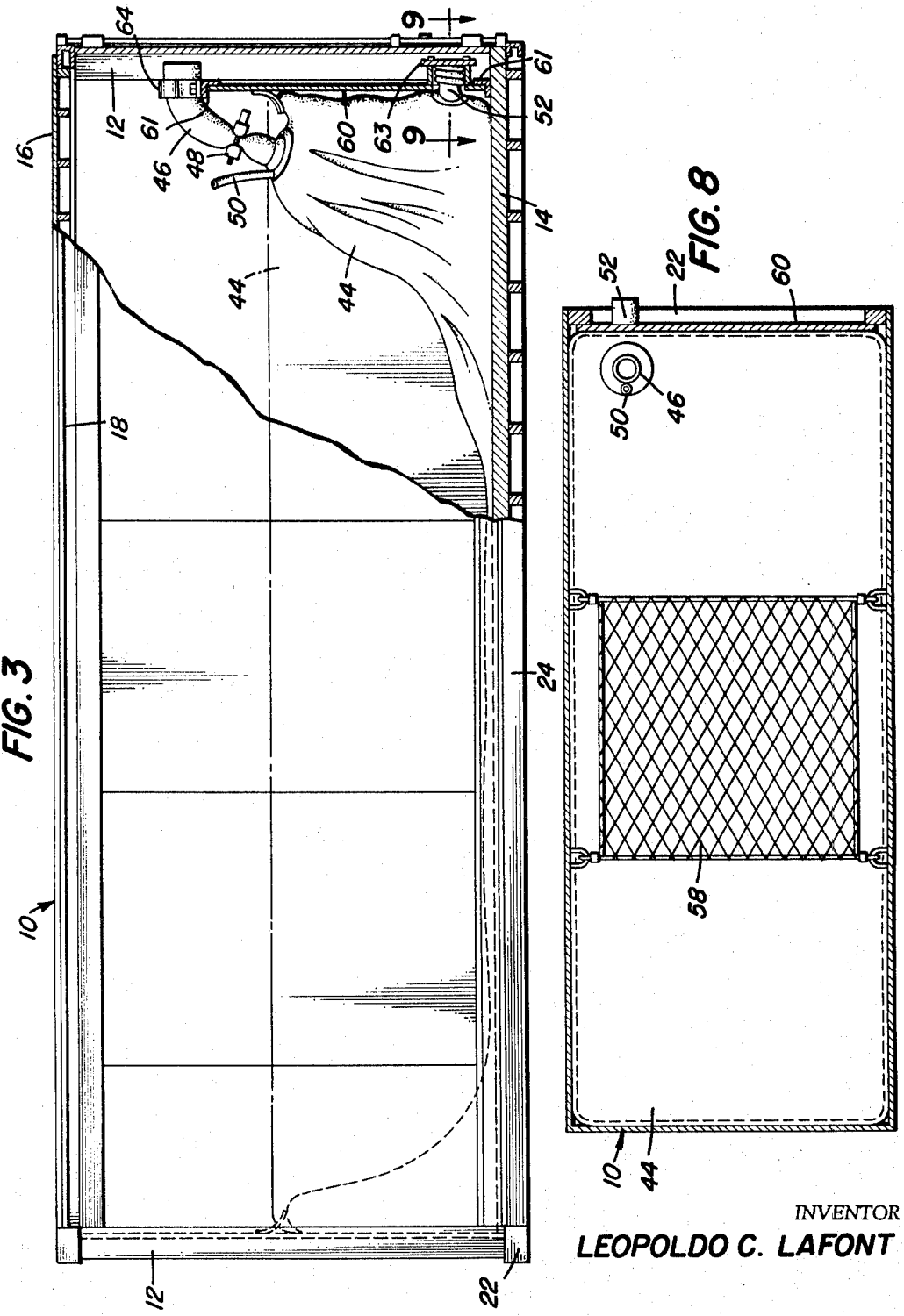
FIGURE 3 is a side elevation with parts broken away of the container in FIGURE 1 with the bag shown in an empty condition. The bag position when filled is shown in phantom lines.

With reference to the drawings, the container includes any conventional standard ASA container generally indicated as 10, two front and rear corner posts 12, a hardwood laminated floor 14, and a one piece walk-on roof sheet 16 which is connected to the container top rails 18 in the conventional manner. In one workable example, the body of the container is made up of upstanding walls 20 which conventionally include a plurality of body panels fastened with aluminum rivets to the roof rail 18, lower front and side rails 22 and 24 respectively and corner posts 12. A plurality of vertical body posts 26 are spaced from each other and serve as spacers, stiffeners and supports for the inner walls of the container. Each body post is a channeled member with the closed leg 28 of the channel riveted to the exterior body panel. Flanges 30 are provided on the parallel legs of channels 26 which serve to support and stiffen the inner walls 32 of the container. Walls 32 can be bolted, riveted, or otherwise secured to flanges 30. The interior walls 32 are conventionally of A–C grade plywood and are mounted to the front and side walls of the container interior. The plywood walls 32 are treated and painted before installation.

The rear of the standardized container is provided with a standard door opening of 85 inches by 90 inches. A pair of door panels 36 are mounted for horizontal rotation by hinge pin inserts 34. Each door 36 is provided with a pair of camlocks 38, antirax and camlock keepers 40 welded to the frame of the container. The camlocks are operated by conventional handles 42 in the known manner.

According to one aspect of the present invention, an elongated flexible, thin plastic walled bag or liner 44 extends throughout the length of the container interior and when filled with liquid bulk cargo, extends throughout a portion of the container height. Liner 44 consists of a rectangular prismatic bag of thin vinyl or polyethylene plastic which may be of any suitable construction such as a laminate or impregnated nylon with fiberglass thread or alternatively a suitable known sandwich construction. The shape of the bag 44 is such that it will lie inside container as flat as possible to avoid wrinkles and it is preferred that the bag dimension be slightly larger than the interior of the container so that stretching of the liner wall when the liner is filled is avoided. Before filling, the ends of the bag should be taped up to start proper shaping.

The actual size and capacity of the bag relative to the container may vary depending upon the amount and density of the liquid cargo to be carried. A primary factor to be considered is the calculated strength of the container which may determine the safe limits of the static and dynamic pressure loads which can be handled. For this reason, it is anticipated that the container of average dimension will carry 13–20 thousand gallons and will not be entirely filled with liquid. The choice of liner 44 dimensions should be made accordingly.

In order to fill and discharge liner 44 with liquid bulk cargo, a fill line or spout 46 is provided at the top rear of liner 44. Loading spout 46 is formed as a flexible pipe made of the same material as the walls of bag 44 but may be thicker in dimension and have an enlarged collar at the junction with the bag top. A suitable mechanical clamp (carpenter's clamp type) 48 is provided to serve as a shut off valve for the filling line. In order to fill, the external supply line can be inserted through spout 46 which is then bound tight to the supply line to prevent leakage. To vent bag 44 during loading and unloading operations, a flexible vent pipe 50 located at the filling spout communicates with the bag interior. As required by liquid characteristics and overall bag dimensions, other vents can also be added at various locations on bag 44.

Loading spout 46 is shown near the center rear of bag 44 so as to be near the portable bulkhead and rear container doors as described below. However, other locations of the loading spout may be preferred depending upon locations of other special container openings. It is preferred that the loading spout be located as shown so as not to interfere to any great degree with the structural integrity of the container.

Liquid discharge of bag 44 is accomplished through a discharge line 52 made of the same material as loading spout 46. Spout 52 is located preferably near the bottom of bag 44 in order to take advantage of the natural pressure head of the liquid cargo. Spout 52 is also preferably located at the rear of bag 44 again because of the rear container doors. A mechanical clamp 54 is provided to insure that spout 52 remains sealed whenever bag 44 is loaded so as to prevent unwanted leakage. Clamp 54 can also control the discharge rate when the liquid cargo is being unloaded. Discharge line 52 will be supplied with the free end sealed to prevent accidental loss of cargo, which seal will be cut when unloading the bag.

Figure 4:
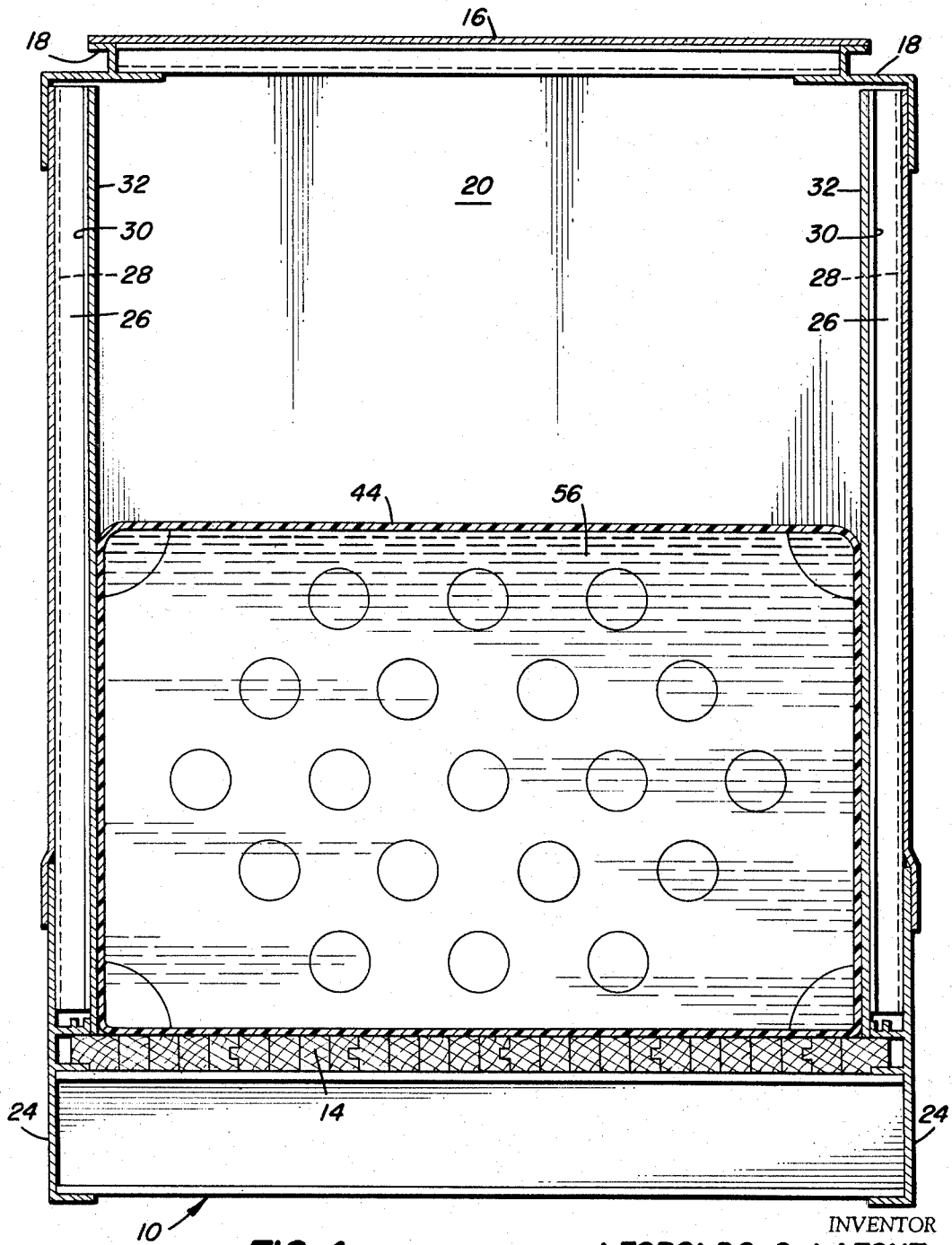
FIGURE 4 is a vertical transverse section taken along line 4—4 of FIGURE 2.

When bag 44 is filled, liquid movement and surging within each container may become a problem during transport. To reduce unwanted liquid oscillation, a swash bulkhead 56 is located at the mid plane of bag 44. Bulkhead 56 can be formed of the same material as bag 44 and may be a sheet or curtain of apertured configuration as shown in FIGURE 4 or in strip form as shown in FIGURE 7. The swash bulkhead will serve two main purposes, absorbing energy of the liquid in motion and maintaining the cross section of the bag at the point which it is attached.

As an alternative to the swash bulkhead, the container can be fitted with a flat net 58 which extends across the mid region of the container interior and confines the upper surface of bag 44. The ends of net 58 are connected to the walls of the container by any conventional means such as rope rings or the like. Net 58 prevents unwanted expansion and contraction of the flexible top wall of bag 44.

In order to use the bag 44 within a conventional container without modification thereof means must be installed to transmit the cargo loads at the door end of the container to the load bearing container structure. In one embodiment of the invention, a portable bulkhead 60 is installed at the rear of the container and just within the rear corner post location. Bulkhead 60 serves as a reinforcing or retaining wall for the contacting end of bag 44. The transverse dimension of bulkhead 60 is such that when it is pressed rearward, the edges thereof contact corner posts 12 and in this way bulkhead 60 transmits cargo loads to the container frame. Bulkhead 60 is provided with reinforced top and bottom ledges with horizontal stiffeners angle profiles 61 so as to withstand the counteracting forces exerted by the cargo load and corner post 12. This bulkhead can be built with a similar material to those of the side panels of the container, aluminum, steel, plywood, reinforced plastics, etc.

The vertical dimension of bulkhead 60 is somewhat less than the height of the rear opening for container 10. The purpose of this opening is to permit manual access into the container interior in order to install or otherwise assemble bag 44 within the container. In addition, the outside connection to the filling spout 46 can be made over the top edge of bulkhead 60.

As better seen in FIGURE 1, bulkhead 60 is provided with an opening in the lower region thereof to accommodate discharge spout 52 of bag 44. This opening should fit snugly about the periphery of the sealing flange of spout 52. A discharge line protector door 63 is hinged to the outside of bulkhead 60 and is locked shut by dogs 65 or the like. With discharge line 52 closed by clamp 54, and bag 44 empty, door 63 is shut to close about folded line 52 and clamp 54 generally as shown in FIGURE 9. Bag 44 is then filled but door 63 prevents line 52 from bulging out as shown in phantom. In this way container doors 36 can be closed without interference. When unloading is to begin, doors 36 and 63 are opened and line 52 extends outward so that discharge line connections can be made.

During assembly, provision should be made to temporarily hold bulkhead 60 in a somewhat vertical position until bag 44 is filled. For this purpose, sliding bolts 62 are fitted on the top of the bulkhead 60 and its outward projecting portion is positioned to fit into an opening of the container wall liner 32 so as to prevent its falling into the container. It should be understood that the retention accomplished by bolt 62 is temporary in nature and that the vertical position of bulkhead 60 becomes secure when bag 44 is loaded.

A retention clamp 64 is mounted in an upstanding position on the top edge of bulkhead 60 in order to hold the loading spout 46 and filling line. If desired, vent line 50 can also be fed through and secured by clamp 64.

Bulkhead 60 may have other configurations. For example, bulkhead 60 can be formed of two or more removable horizontal panels 67 with tongue and groove connections 66, the total vertical dimension of which extends substantially throughout the height of the container. This embodiment illustrated in figure 11 includes a top manhole and loading hatch 70 and a lower gate valve 72 which permits removal of solid bulk cargo. The manhole is fitted with an appropriate removable closure. An upper aperature closed by a threaded disc 74 receives the filling line when necessary. Door 63 and horizontal stiffeners are the same as described above.

The operation of the present invention will now be described. A container of the type described is first fitted with bag 44 and after the bag is almost in position, bulkhead 60 is installed in the manner set forth above. Bulkhead 60 is temporarily retained by pins 62 during which time workmen can flatten and smooth the walls of bag 44 as much as possible. Next, the discharge line 52 is positioned through the bulkhead discharge opening and sealed and clamped closed. Next the protector door is closed. Filling line 46 is connected to the source of liquid cargo and vent 50 positioned vertical. Clamp 48 is opened and bag 44 begins receiving cargo. As the liquid level and pressure head within bag 44 build up, bulkhead 60 is pressed against the corner posts. After the bag is completely filled, clamp 48 is clamped shut and doors 36 on the container end are closed and locked. The container is then shipped by plane, truck, train, or container ship as required and liquid movement within the container is controlled by the particular means provided. At destination, doors 36 of the container 10 and the protector door are opened and the appropriate connection is made to the discharge line 52. Clamp 48 is opened for suitable venting and clamp 54 is opened for rapid discharge of the liquid bulk cargo.

Figure 12:
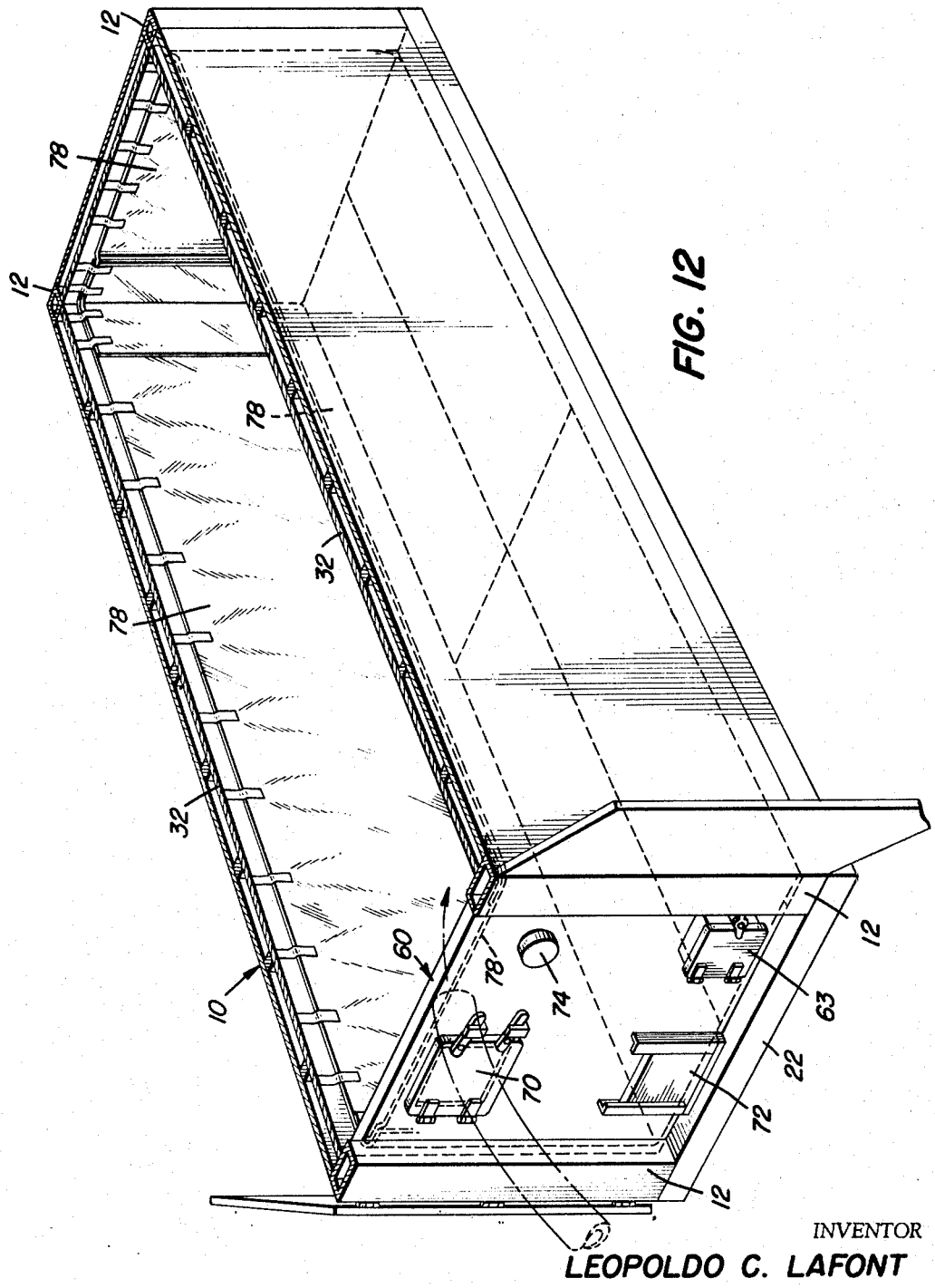
FIGURE 12 is a perspective view illustrating a container attached to carry contaminating dry bulk cargo.

Referring now to FIGURE 12, container 10 fitted with a single piece bulkhead 60 is adapted to receive contamination solid bulk cargo. To reduce contamination, sheets 78 of polyethylene plastic are hung from the tops of the front and side walls of the container interior. Any suitable means can be used to hold the sheets before introduction of the dry bulk. As illustrated, dry bulk is blown into the container after the sheets and bulkhead are installed. As the container is filled near capacity, bulkhead 60 prevents cargo spillage out the front end thereof. When full, the container doors are closed and the container is transported. At destination, the rear doors are opened, and the bulkhead bottom gate is opened and a workman enters the container interior through the top hatch. Dry bulk is discharged through the gate valve until the rear of the container is cleared after which the portable bulkhead is removed and the remainder of the cargo unloaded. If the container is to carry a different type of cargo, the plastic sheets are also removed.

Non-contaminating dry bulk can be carried as described above without installation of the plastic sheets as desired.

It should be understood other modifications can be made to the herein disclosed examples of the present invention without departing from the scope and spirit of the invention.

What is claimed is:

1. A shipping container comprising one end wall, side walls connected to the end wall, a top and bottom, a pair of upstanding corner posts at the end of the container opposite from the one end wall, said corner posts connected to opposite side walls and each having a part extending from the respective side wall toward the center line of the container, an opening for the container defined between the corner posts, a pair of doors each supported by the container on opposite sides of the opening for horizontal rotation, when closed said doors closing said opening outside said corner posts, locking means to secure the doors in a closed position, the improvement comprising a bulkhead having a width greater than the width of the opening measured between the corner posts, said bulkhead being upstandingly positioned generally between the side walls and just within the corner post location such that when pressure is applied on the inside surface of the bulkhead toward the opening and outside the container, the side parts of the bulkhead contact the side posts to resist the pressure.

2. A shipping container as set forth in claim 1 wherein said bulkhead rests on the floor of the container and extends throughout at least a part of the height of the container.

3. A container as set forth in claim 2 wherein said bulkhead includes releasable means for engaging said container to maintain the bulkhead in a generally upright position prior to the loading of the container interior.

4. A container as set forth in claim 1 further comprising bulk cargo within the container interior, said cargo exerting a pressure against the innermost face of the bulkhead forcing said bulkhead against the corner posts.

5. A container as set forth in claim 1 further comprising an elongated bag formed of flexible material extending the length of the container interior and having a height less than the height of the container interior, said bag including a filling spout and a discharge spout and sealing means releasably sealing the discharge spout.

6. A container as set forth in claim 5 wherein the discharge spout is located near the bottom of the bag and extends through an opening provided near the bottom of said bulkhead, said sealing means being located between said bulkhead and the free end of said spout.

7. A container as set forth in claim 6 wherein said bulkhead comprises a protector door which when closed confines the discharge spout in a position next to the outer face of the bulkhead so that the container doors can be closed without interfering with the discharge spout.

8. A container as set forth in claim 6 wherein the container comprises means to prevent expansion of the center region of the container.

9. A container as set forth in claim 8 wherein said last mentioned means comprises a transverse upstanding swash bulkhead formed of the same flexible material as the bag and connected to the top and bottom of the bag, said swash bulkhead defining openings to permit restricted liquid transfer therethrough.

10. A container as set forth in claim 8 wherein said last mentioned means comprises a net-like member attached to the side walls of the container interior and positioned generally horizontal at a position to engage and confine the top center region of the bag when filled.

11. A container as set forth in claim 1 wherein said bulkhead has a height less than the height of the container opening so as to permit manual access over the top of the bulkhead into and out of the container interior.

12. A container as set forth in claim 1 wherein said bulkhead includes horizontal stiffening means which increases the bending modulus of the bulkhead.

13. A container as set forth in claim 1 wherein said bulkhead is formed of at least two horizontal sections positioned one on top of the other and the bulkhead further includes means to maintain the vertical alignment of the horizontal sections.

14. A container as set forth in claim 1 wherein said bulkhead extends substantially throughout the entire height of the container opening and is provided with a loading hatch and removable cover therefore of sufficient size to permit manual access therethrough, said hatch being above the mid height of the bulkhead, and a cargo discharge opening with movable cover therefor located below the bulkhead mid height.

15. A container as set forth in claim 14 further comprising a plurality of flexible sheet members releasably hung from near the top of the side walls and end wall of the container interior and covering said walls and the floor of the container to prevent cargo within the container from contacting the walls and floor thereof.

References Cited

UNITED STATES PATENTS

| 1,555,533 | 9/1925 | Vance. |
| 2,686,613 | 8/1954 | Tamminga _____ 222—183 X |
| 2,712,797 | 7/1955 | Woehrle et al. _____ 220—204 X |
| 3,032,227 | 5/1962 | Guralnick et al. _____ 220—1.5 |
| 3,011,682 | 12/1961 | Kus _____ 222—105 |
| 3,061,133 | 10/1962 | Reynolds _____ 220—1.5 |
| 3,107,024 | 10/1963 | Johnson et al. _____ 220—4 |

FOREIGN PATENTS 509,397 7/1939 Great Britain.

THERON E. CONDON, *Primary Examiner.*

G. E. LOWRANCE, *Assistant Examiner.*